United States Patent
Frazier (10) Patent No.: US 8,165,162 B2
(45) Date of Patent: Apr. 24, 2012

(54) METHOD AND SYSTEM FOR OPTIMIZING FRAGMENT SIZE FOR AGGREGATION AT THE PHYSICAL LAYER

(75) Inventor: Howard Frazier, Pleasanton, CA (US)

(73) Assignee: Broadcom Corporation, Irvine, CA (US)

( * ) Notice: Subject to any disclaimer, the term of this patent is extended or adjusted under 35 U.S.C. 154(b) by 646 days.

(21) Appl. No.: 11/864,709

(22) Filed: Sep. 28, 2007

(65) Prior Publication Data

US 2008/0095168 A1    Apr. 24, 2008

Related U.S. Application Data (60) Provisional application No. 60/862,742, filed on Oct. 24, 2006.

(51) Int. Cl.
*H04J 3/24* (2006.01)
*H04B 7/00* (2006.01)

(52) U.S. Cl. ........................ 370/474; 370/310
(58) Field of Classification Search ................. 370/354, 370/389, 471, 474, 392, 428
See application file for complete search history.

(56) References Cited

U.S. PATENT DOCUMENTS

| | | | | |
|---|---|---|---|---|
| 5,805,822 A | * | 9/1998 | Long et al. | 709/232 |
| 6,341,129 B1 | * | 1/2002 | Schroeder et al. | 370/354 |
| 2005/0169272 A1 | * | 8/2005 | Lo et al. | 370/392 |
| 2006/0126510 A1 | * | 6/2006 | Russell | 370/235 |

OTHER PUBLICATIONS

Deitel, "C++ How to Program: Fourth Edition", 2004, PrenticeHall, all pages.*

* cited by examiner

*Primary Examiner* — Kwang B Yao
*Assistant Examiner* — Adam Duda
(74) *Attorney, Agent, or Firm* — Farjami & Farjami LLP (57) ABSTRACT

Aspects of a system for optimizing fragment size for aggregation at the physical layer may include one more switch ICs and/or physical (PHY) layer ICs that enable reception of data packets via a medium access control layer protocol entity. Each received data packet may be fragmented into a plurality of fragment payloads, wherein a length of each of the plurality of fragment payloads is selected from a plurality of candidate lengths. Each of the plurality of fragment payloads may be sent via a PHY layer protocol entity instance selected from a plurality of PHY layer protocol entity instances.

24 Claims, 6 Drawing Sheets

METHOD AND SYSTEM FOR OPTIMIZING FRAGMENT SIZE FOR AGGREGATION AT THE PHYSICAL LAYER

CROSS-REFERENCE TO RELATED APPLICATIONS/INCORPORATION BY REFERENCE

This application makes reference to, claims priority to, and claims the benefit of U.S. Provisional Application Ser. No. 60/862,742, filed on Oct. 24, 2006, which is hereby incorporated herein by reference in its entirety.

FIELD OF THE INVENTION

Certain embodiments of the invention relate to communication networks. More specifically, certain embodiments of the invention relate to a method and system for optimizing fragment size for aggregation at the physical layer.

BACKGROUND OF THE INVENTION

Computer networks comprise a plurality of interconnected networking devices, such as routers, switches and/or computers. The physical connection that allows one networking device to communicate with another networking device is referred to as a link. Links may utilize wired or wireless communication technologies. Data may be communicated between networking devices via the link in groups of binary bits referred to as packets. The rate at which networking devices may communicate data via a link is referred to as link speed.

The task of achieving increasing link speeds is one of the challenges in computer networking technology. Higher link speeds correspond to higher bandwidth and correspondingly higher data rates. In pursing the goal of higher data rates, network architects may face a number of constraints. Such higher, or "cutting edge", data rates often require components, such as integrated circuit (IC) devices, and interconnect, such as category 6 (Cat6) or Cat7 cabling, which are more expensive than equivalent, more commonly used hardware that may not be capable of achieving the higher data rates. Thus, economic considerations potentially represent one such constraint. Various factors may result in limitations on the speed at which network components may operate, and on the speed at which data may be transferred by the components and/or via interconnect.

As link speeds increase, one operational objective of networking designers may be to incrementally control the bandwidth associated with a link so that bandwidth may be deployed within the network "on demand". The ability to adjust link bandwidth on demand is referred to as scalability. An objective of scalability is to enable adjustment of link bandwidth dynamically under software control, such as from an operations administration and maintenance (OAM) monitoring terminal.

Networks, which utilize cutting edge technologies, which enable the higher data rates are often used to transport data that have considerable value to the users of the networks, for example for exchange of financial data, or for exchange of large volumes of data between very expensive supercomputer systems. Thus, another potential operational objective is to have the ability to gradually decrease the link bandwidth in the presence of impairments that may occur on the link. This ability to operate the link at a reduced bandwidth, rather than to lose use of the link altogether, is referred to as resiliency.

One approach to overcoming some of the limitations described above is to create a logical high bandwidth link by simultaneously transmitting the data via a plurality of lower bandwidth physical links. This method is often referred to as aggregation. Aggregation creates associations between the logical physical link and a group of physical links. In theory, aggregation enables scalability by increasing logical link bandwidth by increasing the number of associated physical links. Thus, if each physical link has a bandwidth of 10 gigabits/second (Gb), a higher speed logical link may be created by transmitting data via two 10 Gb physical links. In theory, the bandwidth of logical link would be 20 Gb.

Aggregation also enables resiliency through gradual decreasing of logical link bandwidth by decreasing the number of associated physical links. For example, a physical link, which experiences a failure, may be removed from association with the logical link while remaining physical links maintain association with the logical link. Thus, in a logical link associated with two 10 Gb physical links, the logical link bandwidth may be gradually decreased by removing one of the physical links in the association.

Ultimately, communications via a network may be evaluated based upon the rate at which user data are transferred. User data may constitute the portion of data, which are generated by an application that is executing at a networking device. A packet being transferred via a network may comprise user data and additional data which are not user data. Such additional data may be referred to as overhead data. Examples of overhead data include header fields and/or trailer fields, which may be appended to a block of user data to generate the packet. In this regard, the aggregate data transfer rate may measure the rate at which user data including overhead are transferred via a network, where the user data rate may refer to the rate at which user data are transferred via the network. The ratio of user data rate to aggregate data rate may be referred to as an efficiency measure. Thus, the performance of networks may ultimately be evaluated based on criteria related to efficiency.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for optimizing fragment size for aggregation at the physical layer, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for optimizing fragment size for aggregation at the physical layer. Various embodiments of the invention may comprise a method and system for segmenting a packet into a plurality of fragment payloads. In one aspect, the fragment payload lengths may be determined based on one or more criteria. In an exemplary embodiment of the invention, one criterion may be based on a computed efficiency measure.

Various embodiments of the invention may be utilized in conjunction with a method and system for aggregation at the physical layer (APL) protocol entity, wherein the APL protocol entity may be located within the data link layer (DLL) or in the physical (PHY) layer in a protocol stack based on a relevant protocol reference model (PRM). An instance of the APL protocol entity may receive packets, each of which may contain a preamble field and a frame start delimiter (FSD) field. The APL protocol entity instance may segment the contents of each packet into a plurality of fragment payload fields. For each fragment payload field, a fragment header field may be generated. For each fragment header field, a cyclical redundancy check (CRC) field may be generated. The CRC field may enable detection and/or correction of binary errors in the corresponding fragment header field. A corresponding plurality of fragments may be generated by appending the corresponding fragment header and CRC fields to each fragment payload field.

Figure 1A:
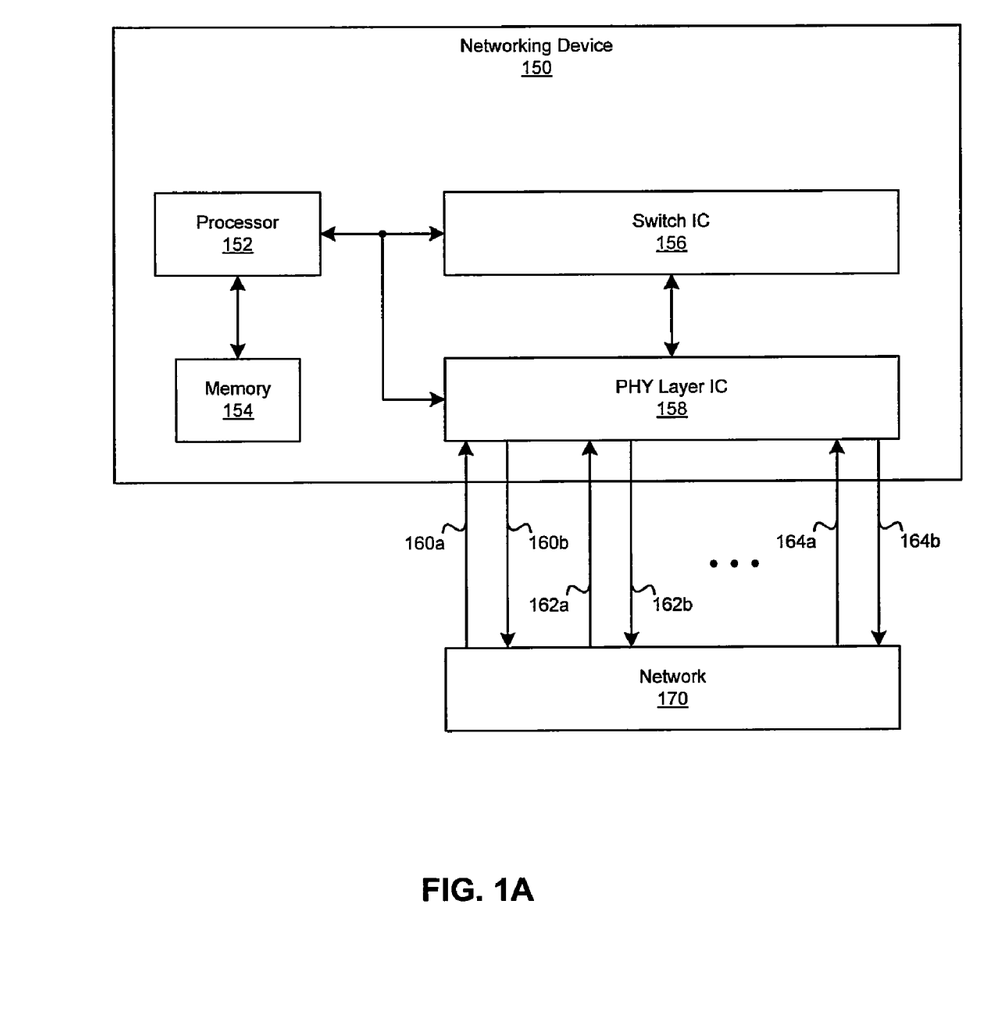
FIG. 1A is a diagram that illustrates an exemplary system for optimizing fragment size, in accordance with an embodiment of the invention.

FIG. 1A is a diagram that illustrates an exemplary system for optimizing fragment size, in accordance with an embodiment of the invention. Referring to FIG. 1, there is shown a networking device 150 and a plurality of physical links 160a, 160b, 162a, 162b, . . . , 164a and 164b. The networking device 150 may comprise a processor 152, at least one memory module 154, at least one switch integrated circuit (IC) 156 and at least one physical (PHY) layer IC 158.

The processor 152 may comprise suitable logic, circuitry and/or code, which, in the context of the present application, may enable determination of one or more fragment lengths, which may be utilized for aggregation at the physical layer. The processor 152 may execute code that enables computation of the fragment lengths based on one or more criteria, for example, an efficiency measure.

The memory 154 may comprise suitable logic, circuitry and/or code that may enable storage and/or retrieval of data and/or code. The memory 154 may utilize any of a plurality of storage medium technologies, such as volatile memory, for example random access memory (RAM), and/or non-volatile memory, for example electrically erasable programmable read only memory (EEPROM). In the context of the present application, the memory 154 may enable storage of code and/or data that enables determination of one or more fragment lengths based on one or more criteria.

The switch IC 156 may enable data link layer (DLL) related switching functions, such as bridging. The PHY layer IC chip 158 may enable PHY layer related functions, such as transmitting and/or receiving signals via one or more physical links. The physical links 160a, 160b, 162a, 162b, . . . , 164a and 164b may comprise optical fibers and/or copper cable, for example.

In operation, the processor 152 may determine a length of a packet, which may be processed within the switch IC. The processor 152 may enable segmentation of the packet such that each segment may correspond to a fragment payload. The processor 152 may compute a length for each fragment. The processor 152 may communicate the computed fragment payload length(s) to the switch IC 156 and/or PHY layer IC 158. In response, the switch IC 156 or PHY IC 158 may generate a plurality of fragments, wherein the length of each fragment may be based on the computed fragment payload lengths computed by the processor 152. The fragments may then be distributed among the plurality of physical links 160a, 160b, 162a, 162b, . . . , 164a and/or 164b and transmitted via a network 170.

Figure 1B:
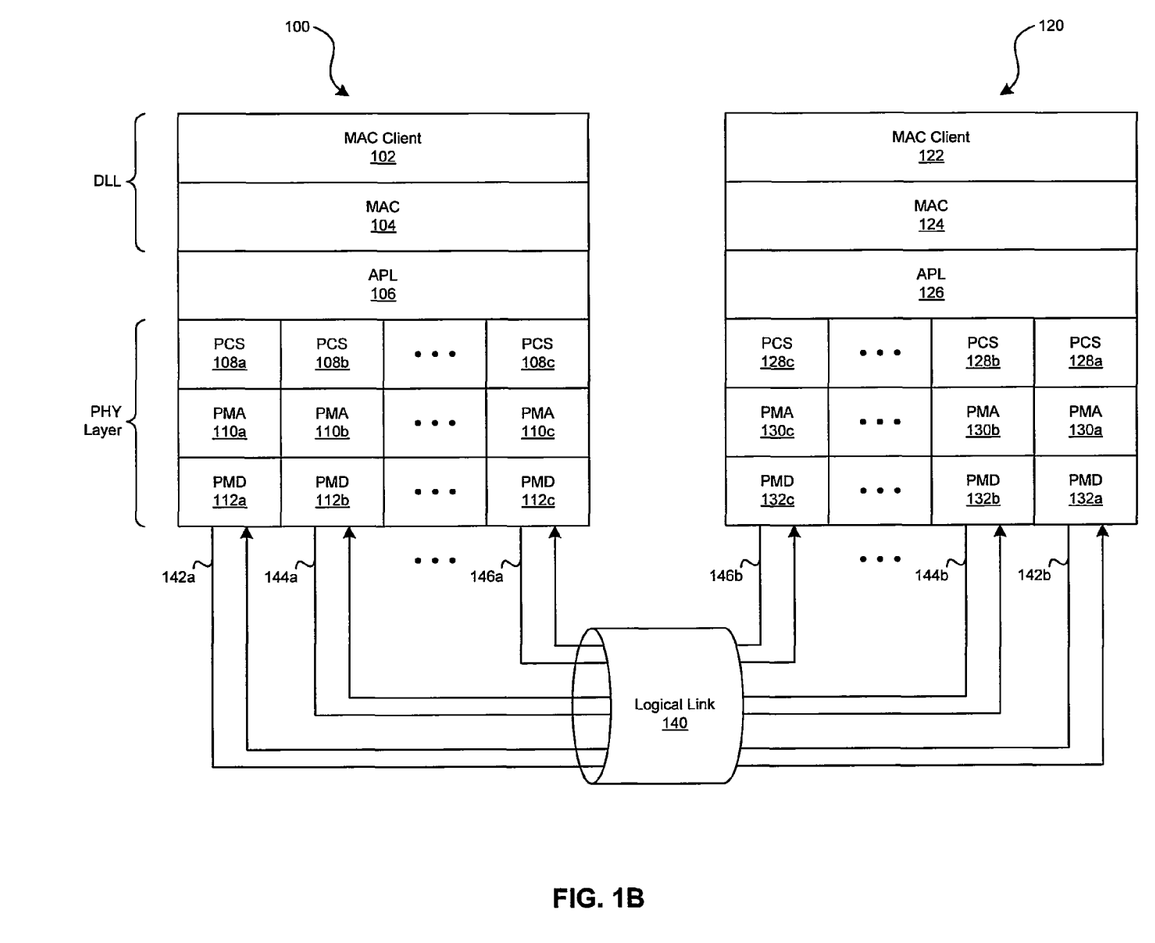
FIG. 1B is a diagram that illustrates an exemplary protocol stack for physical layer aggregation, in accordance with an embodiment of the invention.

FIG. 1B is a diagram that illustrates an exemplary protocol stack for physical layer aggregation, in accordance with an embodiment of the invention. Referring to FIG. 1B, there is shown a networking device 100, a networking device 120, a logical link 140, and a plurality of physical links 142a, 142b, 144a, 144b, . . . , 146a and 146b. The networking device 100 may comprise a protocol stack, which includes a MAC client entity 102, a MAC entity 104, an APL entity 106, a plurality of PCS entities 108a, 108b, . . . , 108c, a plurality of physical medium attachment (PMA) entities 110a, 110b, . . . , 110c, and a plurality of physical medium dependent (PMD) entities 112a, 112b, . . . , 112c. The networking device 120 may comprise a protocol stack, which may comprise a MAC client entity 122, a MAC entity 124, an APL entity 126, a plurality of PCS entities 128a, 128b, . . . , 128c, a PMA entities 130a, 130b, . . . , 130c, and a plurality of PMD entities 132a, 132b, . . . , 132c.

The networking devices 100 and 120 may be communicatively coupled via a plurality of physical links. FIG. 1B illustrates an exemplary full duplex coupling in which physical links 142a, 144a, . . . , and 146a enable networking device 100 to communicate data to networking device 120, while physical links 142b, 144b, . . . , and 146b enable networking device 120 to communicate data to networking device 100. The plurality of physical links 142a, 142b, 144a, 144b, . . . , 146a and 146b may be associated with a logical link 140.

The MAC client 102 may represent a protocol entity that may either comprise a logical link control (LLC) entity, or a bridge entity, for example. A description of the LLC entity may be specified in IEEE 802.2 standards. A description of the bridge entity may be specified in IEEE 802.1 standards. The MAC client 102 may be implemented in software, firmware and/or hardware.

The MAC entity 104 may represent a protocol entity that controls access by the networking device 100 to the physical links 142a, 142b, 144a, 144b, . . . , 146a and 146b. A description of the MAC entity 104 may be specified in IEEE 802.3 standards. Two functions performed within the MAC entity 104 may include data encapsulation and medium access control. Within a source networking device, data encapsulation may comprise a set of functions that receive data to be communicated via a network, and assembles a packet by appending header fields and/or trailer fields to the data. The packet may then be transported from a source networking device to a destination networking device via the network. Within a destination networking device, data encapsulation may comprise a set of functions that receive a packet via a network, and extract the data by parsing the packet to remove header fields and/or trailer fields. The medium access control entity 104 may comprise a set of functions that enable initiation of transmission of packets via the network and/or recovery from transmission failures, such as when a packet transmitted from the source networking device is not successfully received by the destination networking device.

The PCS entity may represent a protocol entity, which in a source networking device, receives packets from a higher layer protocol entity and provides logic for encoding binary data contained in packets to line code for transmission via a physical link. An exemplary encoding method is 64B/66B encoding, in which 64 bits of data may be transformed to a 66 bit line code. The line code may be serialized. The PCS entity may send the line code to a lower layer protocol entity. In a destination networking device, the PCS entity may receive line code from a lower layer protocol entity and decode the line code to generate a packet containing data. The PCS entity may send the decoded packet to the higher layer protocol entity.

Within the protocol stack shown within the networking device 100, there may be a plurality of PCS instances corresponding to a plurality of physical links. For example, the PCS instance PCS 108a may be associated with the physical links 142a and 142b, the PCS instance PCS 108b may be associated with the physical links 144a and 144b and the PCS instance PCS 108c may be associated with the physical links 146a and 146b.

The PMA entity may represent a protocol entity, which in a source networking device, receives line code from a higher layer protocol entity and provides logic performing physical medium dependent coding of the received line codes. The PMA entity may generate code representations of the received line codes, which may be utilized for generating signals that may be transmitted via a physical link. The PMA entity may receive line code and generate, for example, a non-return to zero (NRZ) representation for each received line code bit. The PMA entity may also generate signal timing information. The PMA entity may send the code representations and signal timing information to a lower layer protocol entity. In a destination networking device, the PMA entity may receive code representations from a lower layer protocol entity and convert the code representations, which may be based on a specific physical medium type, to line code bits, for which the representations may be independent of a specific physical medium type. The destination PMA entity may recover signal timing information received from the received code representations, which may be utilized during the line code generation process. The destination PMA entity may send the line code to a higher layer protocol entity.

Within the protocol stack shown within the networking device 100, there may be a plurality of PMA instances corresponding to a plurality of physical links. For example, the PMA instance PMA 110a may be associated with the physical links 142a and 142b, the PMA instance PMA 110b may be associated with the physical links 144a and 144b and the PMA instance PMA 110c may be associated with the physical links 146a and 146b.

The PMD entity may represent a protocol entity, which in a source networking device, receives code representations from a higher layer protocol entity and provides logic for generating signals that may be transmitted via a physical link. The PMD entity may receive code representations and generate signals comprising voltage levels when the physical link transmits electrical signals, or the PMD entity may generate signals comprising one or more optical wavelengths when the physical link transmits optical signals. The PMD entity may send the signals to a physical link. In a destination networking device, the PMA entity may receive electrical and/or optical signals from a physical link and convert the signals to code representations. The destination PMA entity may send the code representations to a higher layer protocol entity.

Within the protocol stack shown within the networking device 100, there may be a plurality of PMD instances corresponding to a plurality of physical links. For example, the PMD instance PMD 112a may be associated with the physical links 142a and 142b, the PMD instance PMD 112b may be associated with the physical links 144a and 144b and the PMD instance PMD 112c may be associated with the physical links 146a and 146b.

The physical links 142a, 142b, 144a, 144b, . . . , 146a and 146b may comprise a variety of physical medium types, such as optical fiber or copper. Examples of physical link types may include 10 GBASE-SR, 10 GBASE-LRM, 10 GBASE-LR, 10 GBASE-ER, 10 GBASE-ZR, 10 GBASE-LX4, 10 GBASE-CX4, 10 GBASE-KX, 10 GBASE-KR and 10 GBASE-T, for example.

The MAC client 102 and MAC 104 protocol entities may comprise functionality, which may correspond to the DLL in the ISO PRM. The PCS, PMA and PMD protocol entities may comprise functionality, which may correspond to the PHY layer in the ISO PRM.

The APL 106 may represent a protocol entity, which may be located between the DLL and the PHY layer in a protocol stack. The APL 106 may provide functionality, which in a source networking device, enables a packet to be received from a higher layer protocol entity. In various embodiments of the invention, the higher layer protocol entity may be located within the DLL in a protocol stack. Within a source networking device, the APL 106 may generate a plurality of fragment payloads, wherein each fragment payload comprises a portion of the data contained in the received packet. The APL 106 may then generate a fragment header for each of the fragment payloads. Each fragment header may comprise a sequence number and an indication of whether the associated fragment payload comprises a first portion of a packet, last portion of a packet, or neither. In various embodiments of the invention, the fragment comprising the first portion of the packet may also contain at least a portion of a preamble when the packet contains a preamble. The binary value of the preamble contained in one of more fragments may be equal to the binary value of the preamble contained in the associated packet. Thus, in various embodiments of the invention, the preamble field from the packet may not be discarded when generating fragments. The APL 106 may generate a CRC for each fragment header. The APL 106 may then generate a plurality of fragments by appending to each fragment payload a corresponding fragment header and corresponding CRC. The plurality of fragments may be distributed among a plurality of lower layer protocol instances. In various embodiments of the invention, each of the lower layer protocol instances may be located within the PHY layer in a protocol stack.

Within a destination networking device, the APL 106 may receive a plurality of fragment payloads from a plurality of lower layer protocol instances. In various embodiments of the invention, each of the lower layer protocol instances may be located within the PHY layer. Upon receiving each fragment, the APL 106 may inspect the CRC field to detect and/or correct bit errors in the fragment header. The APL 106 may inspect the fragment header to determine which portion of a received packet is contained within the fragment payload. Based on the fragment headers, the APL 106 may determine that each of the fragments contained within a packet has been received when it, for example, receives: i) a fragment with a fragment number, <F1>, which may comprise an indication that the fragment contains a first portion of a packet; ii) a fragment with a fragment number, <FM>, which may comprise an indication that the fragment contains a last portion of the packet; and iii) each of the fragments <F1+1>, <F1+2>, ..., and <FM−1>. Upon receipt of the group of fragments, the APL 106 may assemble a received packet. The APL 106 may receive fragments in an arbitrary order and rearrange the order of received fragments based on the contents of the fragment header. The APL 106 may extract the fragment payloads from the rearranged fragments and assemble a received packet. The received packet may then be sent to a higher layer protocol entity. In various embodiments of the invention, the higher layer protocol entity may be located within the MAC layer.

The MAC client 122 may be substantially similar to the MAC client 102. The MAC 124 may be substantially similar to the MAC 104. The APL 126 may be substantially similar to the APL 106. The PCS 128a, 128b, ..., 128c may be substantially similar to the PCS 108a. The PMA 130a, 130b, ..., 130c may be substantially similar to the PMA 110a. The PMD 132a, 132b, ..., 132c may be substantially similar to the PMD 112a.

In operation, the networking device 100 may be a source networking device in engaged in a single conversation with the networking device 120, which may be a destination networking device. As the networking device 100 may send data to the networking device 120. The networking device 100 may utilize the logical link 140 to communicate with the networking device 120. Within the logical link 140, the networking device 100 may utilize physical links 142a, 144a, ..., and 146a to communicate data to the networking device 120.

Within the networking device 100, the MAC client 102 may send a packet P1 to the MAC 104. The MAC 104 may send the packet P1 to the APL 106. The APL 106 may copy portions of the packet P1 into fragment payloads. A fragment payload FP1 may comprise a first portion of data contained in the packet P1. The fragment payload PF1 may comprise a preamble field when the packet P1 contains a preamble. The binary value of the preamble field copied into the fragment payload FP1 may be equal to the binary value of the preamble field contained in the payload P1. A fragment payload FP2 may comprise a second portion of data contained in the packet P1. A fragment payload FP3 may comprise a third portion of the data contained in the packet P1 and FPM may comprise a final portion of the data contained in the packet P1.

The APL 106 may generate a fragment header for each of the fragment payloads. The first fragment header, FH1 may comprise a sequence number <F1> associated with the fragment payload FP1 and an indication that the fragment payload comprises the first portion of the packet P1. The APL 106 may generate a CRC field, CRC1, based on the fragment header FH1. The CRC field, CRC1, may be computed based on the binary data contained in the fragment header FH1 by utilizing any of a plurality of CRC generator polynomials. A first fragment F1 may be generated by combining FH1, CRC1 and FP1.

The APL 106 may also generate fragment headers for fragment payloads FP2, FP3, ..., and FPM. The fragment header for FP2, FH2, may comprise a sequence number <F1+1> and an indication that the fragment payload FP2 contains neither a first or last portion of the packet P1. A CRC field, CRC2, may also be generated for FH2. A second fragment F2 may be generated by combining FH2, CRC2 and FP2. The fragment header for FP3, FH3, may comprise a sequence number <F1+2> and an indication that the fragment payload FP3 contains neither a first or last portion of the packet P1. A CRC field, CRC3, may also be generated for FH3. A third fragment F3 may be generated by combining FH3, CRC3 and FP3. The fragment header for FPM, FHM, may comprise a sequence number <FM> and an indication that the fragment payload FPM contains a last portion of the packet P1. A CRC field, CRCM, may also be generated for FHM. A last fragment FM may be generated by combining FHM, CRCM and FPM.

The APL 106 may distribute the fragments among a plurality of PCS instances in the group PCS 108a, 108b, ..., and 108c. The PCS 108a may enable data to be transmitted via the physical link 142a, the PCS 108b may enable data to be transmitted via the physical link 144a and the PCS 108c may enable data to be transmitted via the physical link 146a. By distributing the fragments among the PCS 108a, 108b, ..., and 108c, the APL 106 may be able to exploit scalability properties available in the logical link 140 for transmission of data associated with a single conversation. In addition, the APL 106 may be enabled to support resiliency properties available in the logical link 140 by utilizing physical links, which are in an operational, non-failed state. The APL 106 may utilize a variety of criteria in selecting which PCS instances are to receive which fragments. In an exemplary embodiment of the invention, the APL 106 may utilize a round robin method. In another exemplary embodiment of the invention, the APL 106 may utilize a load balancing method, which may attempt to make equal utilization of physical links associated with a logical link 140.

In an exemplary embodiment of the invention in which there may be a plurality of N PCS instances, the APL 106 may send fragment F1 to PCS 108a, fragment F2 to PCS 108b, ..., fragment FN to PCS 108c, fragment FN+1 to PCS 108a, fragment FN+2 to PCS 108b, ..., fragment FM-(N−1) to PCS 108a, fragment FM-(N−2) to PCS 108b, ..., and fragment FM to PCS 108c. The PCS 108a may encode each received fragment and send the encoded fragments to the PMA 110a. The PCS 108a may send the encoded fragments to the PMA 110a bit serially. The PMA 110a may convert the bits in each encoded fragment to a NRZ representation and send the NRZ encoded fragments to the PMD 112a. The PMD 112a may generate signals based on the NRZ encoded fragments and transmit the signals via the physical link 142a.

The PCS 108b, the PMA 110b and the PMD 112b may operate substantially similar to the PCS 108a, the PMA 110a and the PMD 112a. The PMD 112b may transmit signals via the physical link 144a. The PCS 108c, the PMA 110c and the PMD 112c may operate substantially similar to the PCS 108a, the PMA 110a and the PMD 112a. The PMD 112c may transmit signals via the physical link 146a.

Within the networking device 120, the PMD 132a may receive signals via the physical link 142a. The PMD 132a may convert the signals to an NRZ encoded representation and send the NRZ encoded bits to the PMA 130a. The NRZ encoded bits may be sent to the PMA 130a bit serially. The PMA 130a may convert the NRZ encoded bit to line coded bits. The PMA 130a may send the line coded bits to the PCS 128a. The line coded bits may be sent to the PCS 128a bit serially. The PCS 128a may collect the line coded bits and convert the line coded bits to binary data bits. The PCS 128a may assemble data bits to generate a received fragment, for example received fragment F1'. The received fragment F1' may be sent to the APL 126.

The APL 126 may receive the fragment F1' and inspect the CRC field, CRC1'. Based on the binary data contained in the received fragment header FH1' and the received CRC field CRC', the APL 126 may detect and/or correct bit errors in the received fragment header FH1'. After verifying the integrity of the fragment header, the APL 126 may inspect the contents of the fragment header FH1' to determine the sequence number and to determine which the corresponding fragment payload FP1' may contain a first portion of the packet P1, last portion, or neither. In this exemplary instance, the fragment header FH1' may contain a sequence number <F1> and an indication that the fragment payload FP1' may contain the first portion of the packet P1. The fragment payload FP1' may contain a preamble field. The binary value of the preamble field contained in the fragment payload FP1' may be equal to the binary value of the preamble field in the packet P1. The APL 126 may store the received fragment F1' pending receipt of additional fragments.

The PMD 132*a*, PMA 130*a* and PCS 128*a* may receive additional signals via the physical link 142*a* and generate subsequent fragments, which may be sent to the APL 126. In addition, the PMD 132*b*, PMA 130*b* and PCS 128*b* may operate substantially similar to PMD 132*a*, PMA 130*a* and PCS 128*a*. The PMD 132*b* may receive signals via the physical link 144*a*. The PMD 132*c*, PMA 130*c* and PCS 128*c* may operate substantially similar to PMD 132*a*, PMA 130*a* and PCS 128*a*. The PMD 132*c* may receive signals via the physical link 146*a*.

The APL 126 may determine when it has received each of the fragments associated with the packet P1 as set forth above. The APL 126 may assemble the received fragments to generate a received packet P1' as set forth above. The received packet P1' may be sent to the MAC 124. The MAC 124 may send the received packet to the MAC client 122.

In various embodiments of the invention, the APL 106 may receive and/or send packets from and/or to the MAC 104. Thus, to the MAC 104, the interface to the APL 106 may be substantially similar to the interface between the MAC 104 and a PHY layer protocol entity. In various embodiments of the invention, the APL 106 may distribute and/or receive each of a plurality of generated fragments to and/or from the lower layer protocol instances as though the fragments were packets. Thus, to a PHY layer protocol instance such as the PCS 108*a*, the interface to the APL 106 may be substantially similar to the interface between the PHY layer protocol instance and the MAC 104.

In various embodiments of the invention, a preamble field in the packet P1 generated by the networking device 100 may be communicated to the networking device 120 via a preamble field in the received packet P1'. Thus, in various embodiments of the invention, the preamble field may be utilized to communicate information, for example OAM, from a source networking device to a destination networking device.

Figure 2:
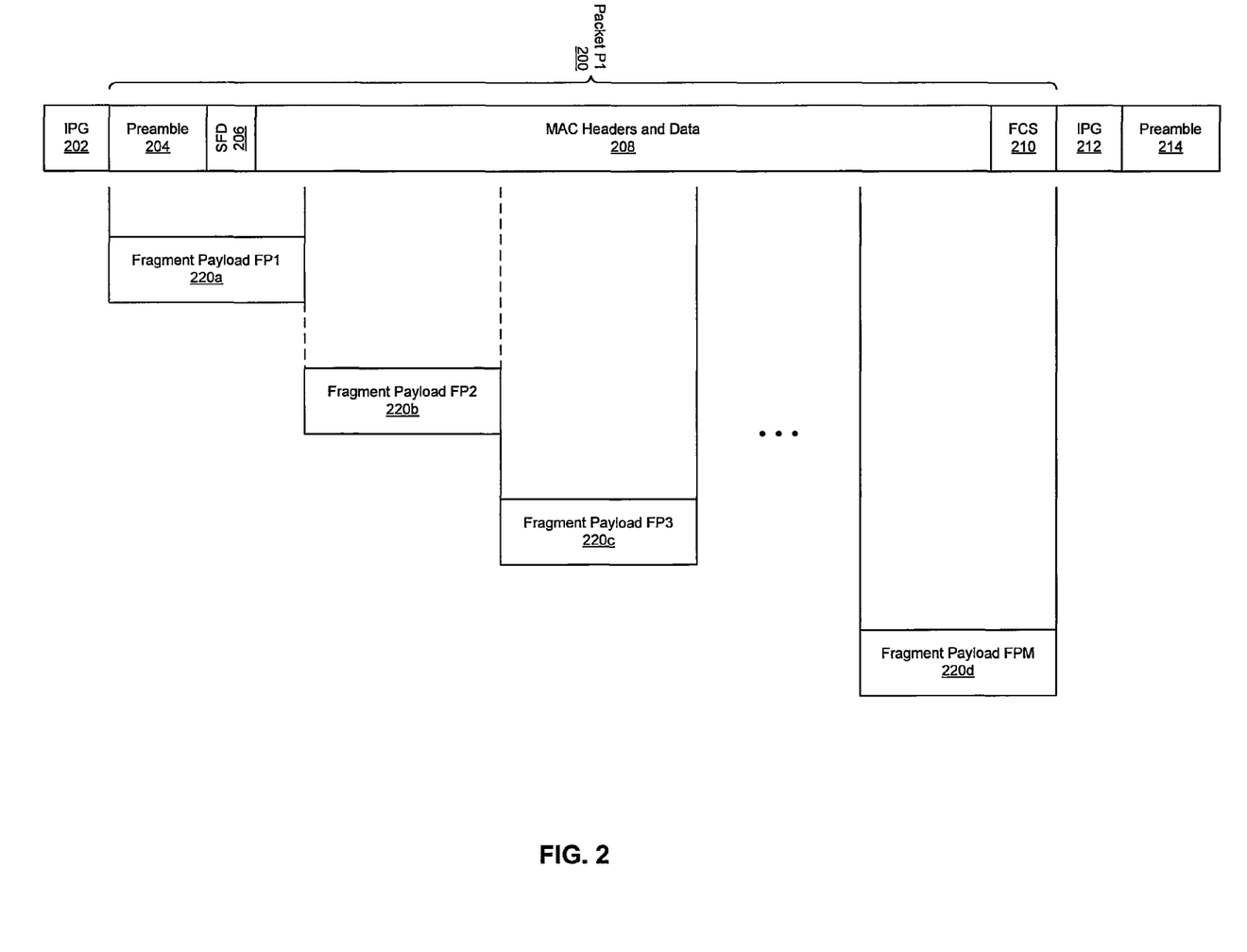
FIG. 2 is a diagram of exemplary packet fragmentation, in accordance with an embodiment of the invention.

FIG. 2 is a diagram of exemplary packet fragmentation, in accordance with an embodiment of the invention. Referring to FIG. 2, there is shown a packet 200, inter packet gap (IPG) fields 202 and 212 and preamble field 214. An example of the packet 200 may be the packet P1 reference in FIG. 1B. The packet 200 may comprise a preamble field 204, a start of frame delimiter (SFD) 206, MAC headers and data 208, and a frame check sequence (FCS) field 210. The preamble field 204 may comprise a determined value, for example, an alternating 01 bit pattern, or the preamble field 204 may comprise data, for example OAM data, which is being communicated between a source networking device and a destination networking device.

The SFD 206 may comprise a binary value, which may indicate the beginning of the MAC headers and data field 208. The MAC headers and data field 208 may comprise an address for the source networking device and/or destination networking device and data which is being communicated between the two networking devices. The FCS 210 may be computed based on the MAC headers and data field 208 and may enable detection and correction of bit errors in the MAC headers and data field 208. The IPG 202 and 212 may precede and follow the packet 200. The IPG 202 may refer to a time interval between the end of transmission of a previous packet, and the beginning of transmission of the packet 200. The IPG 212 may refer to a time interval between the end of transmission of the packet 200, and the beginning of transmission of a succeeding packet. The preamble 214 may be a field contained within the succeeding packet.

Also shown in FIG. 2 is an exemplary segmentation of the data contained in the packet 200 into fragment payloads 220*a*, 220*b*, 220*c* . . . , and 220*d*. The fragment payload 220*a* may comprise a first portion of the packet 200. The fragment payload 220*a* may comprise the preamble field 204 from the packet 200. An exemplary fragment payload 220*a* may be the fragment payload FP1 described in FIG. 1B. The fragment payload 220*b* may comprise a second portion of the packet 200. An exemplary fragment payload 220*b* may be the fragment payload FP2 described in FIG. 1B. The fragment payload 220*c* may comprise a third portion of the packet 200. An exemplary fragment payload 220*c* may be the fragment payload FP3 described in FIG. 1B. The fragment payload 220*d* may comprise a last portion of the packet 200. An exemplary fragment payload 220*d* may be the fragment payload FPM described in FIG. 1B.

Figure 3:
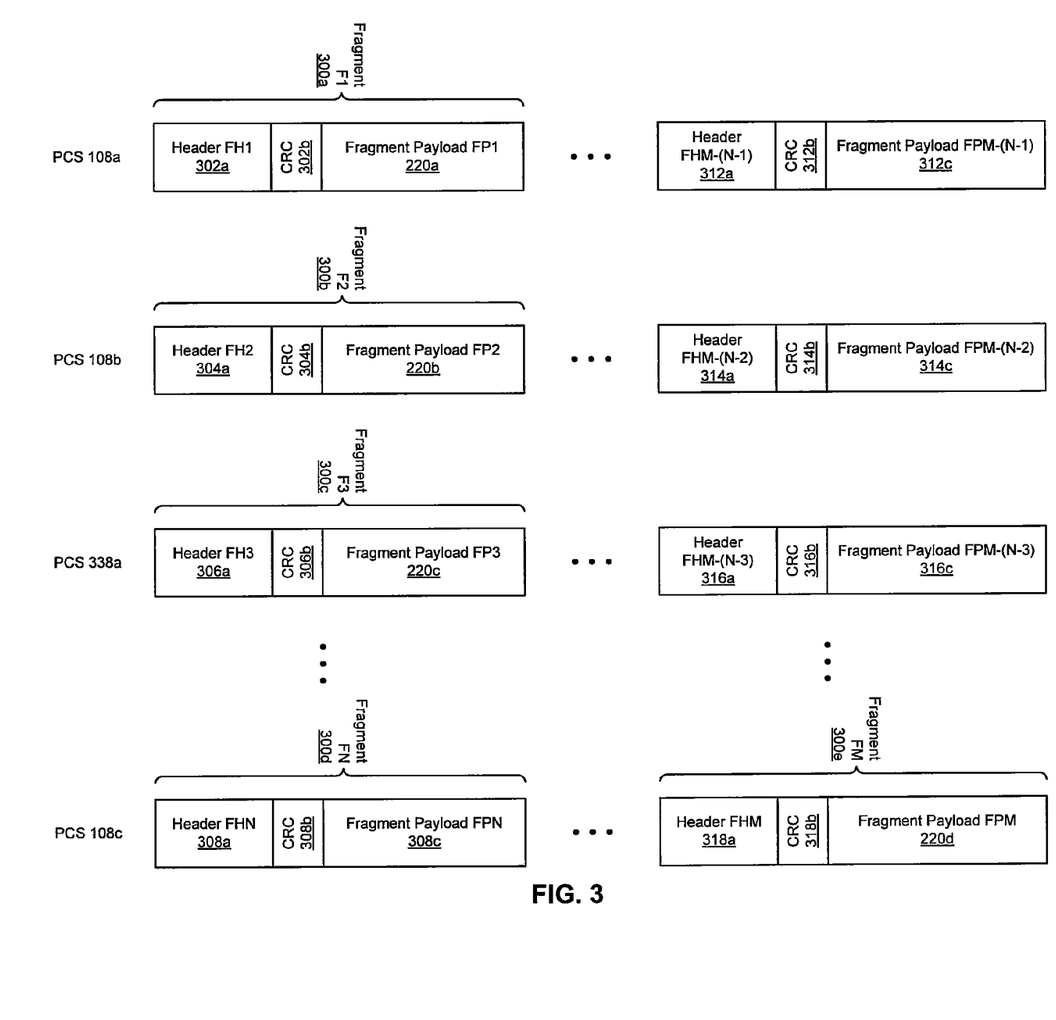
FIG. 3 is a diagram illustrating an exemplary distribution of fragments among a plurality of physical coding sublayer entities, in accordance with an embodiment of the invention.

FIG. 3 is a diagram illustrating an exemplary distribution of fragments among a plurality of physical coding sublayer entities, in accordance with an embodiment of the invention. Referring to FIG. 3, there is shown a plurality of fragments 300*a*, 300*b*, 300*c*, . . . , 300*d*, . . . , and 300*e*. Also shown is a plurality of fragment headers 302*a*, 304*a*, 306*a*, . . . , 308*a*, . . . , 312*a*, 314*a*, 316*a*, . . . , and 318*a*, a plurality of CRC fields 302*b*, 304*b*, 306*b*, . . . , 308*b*, . . . , 312*b*, 314*b*, 316*b*, . . . , and 318*b*. Also shown is a plurality of fragment payloads 220*a*, 220*b*, 220*c*, . . . , 308*c*, . . . , 312*c*, 314*c*, 316*c*, . . . , and 220*d*.

The APL 106 may generate fragment 300*a* by combining fragment header 302*a*, CRC 302*b* and fragment payload 220*a*. An exemplary fragment 300*a* may be fragment F1 described in FIG. 1B. An exemplary fragment header 302*a* may be fragment header FH1 described in FIG. 1B. An exemplary CRC field 302*b* may be CRC1 described in FIG. 1B.

The APL 106 may generate fragment 300*b* by combining fragment header 304*a*, CRC 304*b* and fragment payload 220*b*. An exemplary fragment 300*b* may be fragment F2 described in FIG. 1B. An exemplary fragment header 304*a* may be fragment header FH2 described in FIG. 1B. An exemplary CRC field 304*b* may be CRC2 described in FIG. 1B.

The APL 106 may generate fragment 300*c* by combining fragment header 306*a*, CRC 306*b* and fragment payload 220*c*. An exemplary fragment 300*c* may be fragment F3 described in FIG. 1B. An exemplary fragment header 306*a* may be fragment header FH3 described in FIG. 1B. An exemplary CRC field 306*b* may be CRC3 described in FIG. 1B.

The APL 106 may generate fragment 300*d* by combining fragment header 308*a*, CRC 308*b* and fragment payload 308*c*. An exemplary fragment 300*d* may be fragment FN described in FIG. 1B. The APL 106 may generate fragment 300*e* by combining fragment header 318*a*, CRC 318*b* and fragment payload 220*d*. An exemplary fragment 300*e* may be fragment FM described in FIG. 1B.

Additional fragments may be generated, for example a fragment may comprise fragment header 312*a*, CRC field 312*b*, and fragment payload 312*c*, another fragment may comprise fragment header 314*a*, CRC field 314*b*, and fragment payload 314c and another fragment may comprise fragment header 316a, CRC field 316b, and fragment payload 316c.

In an exemplary embodiment of the invention, the APL 106 may send fragment 300a to PCS 108a, fragment 300b to PCS 108b, fragment 300c to a PCS 338a, and fragments 300d and 300e to PCS 108c.

Figure 4:
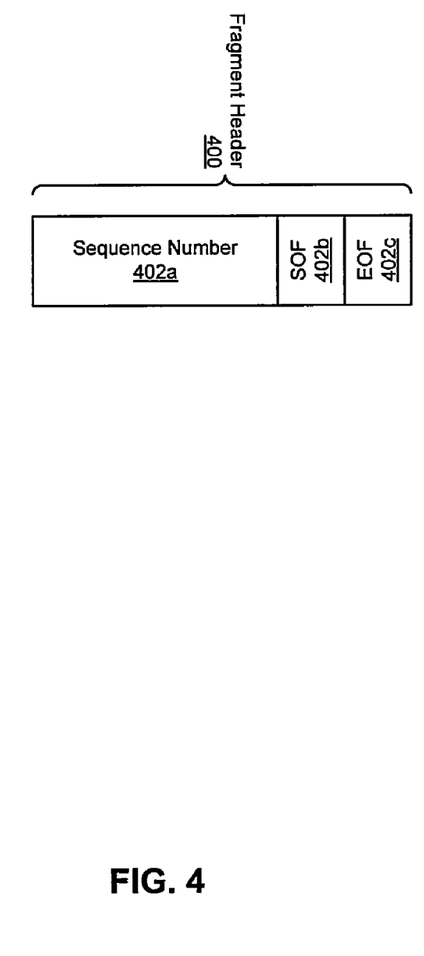
FIG. 4 is a diagram of an exemplary fragment header for physical layer aggregation, in accordance with an embodiment of the invention.

FIG. 4 is a diagram of an exemplary fragment header for physical layer aggregation, in accordance with an embodiment of the invention. Referring to FIG. 4, there is shown a fragment header 400. The fragment header 400 may comprise a sequence number field 402a, a start of frame (SOF) field 402b and an end of frame (SOF) field 402c. An exemplary fragment header 400 may comprise fragment header FH1 described in FIG. 1B. An exemplary sequence number field 402a may be the sequence number <F1> described in FIG. 1B. The SOF field 402b may comprise an indication, SOF=1, that the associated fragment payload contains the first fragment in a packet. A value SOF=0 may indicate that the associated fragment payload may not contain the first fragment in the packet. The EOF field 402c may comprise an indication, EOF=1, that the associated fragment payload contains the last fragment in a packet. A value EOF=0 may indicate that the associated fragment payload may not contain the last fragment in the packet.

Figure 5:
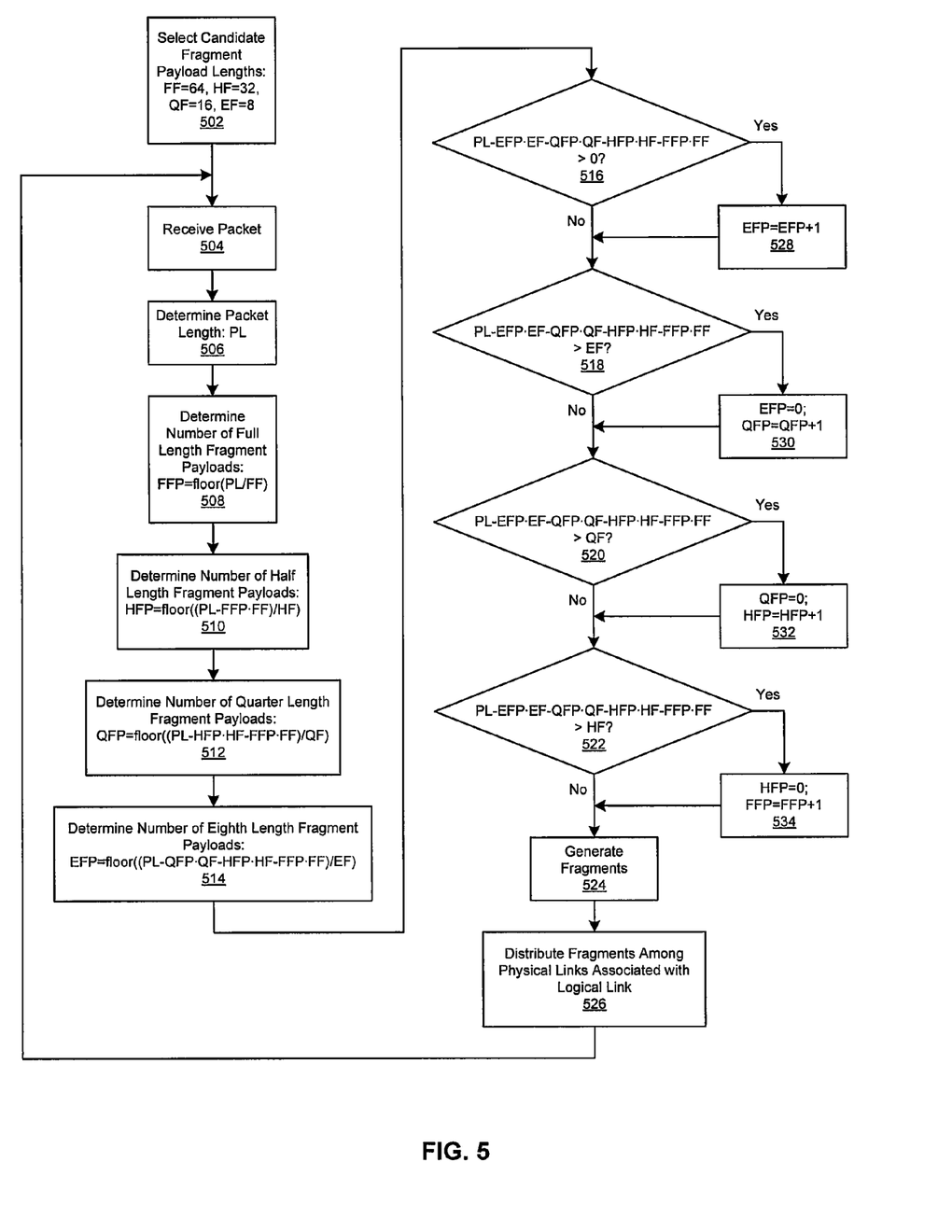
FIG. 5 is a flowchart illustrating exemplary steps for optimizing fragment size for aggregation at the physical layer, in accordance with an embodiment of the invention.

FIG. 5 is a flowchart illustrating exemplary steps for optimizing fragment size for aggregation at the physical layer, in accordance with an embodiment of the invention. Referring to FIG. 5, in step 502, candidate fragment payload lengths, as measured in octets for example, may be selected. In an exemplary embodiment of the invention, candidate fragments lengths may comprise a full fragment payload length of 64 octets, FF=64, a half fragment payload length of 32 octets, HF=32, a quarter fragment payload length of 16 octets, QF=16, and an eighth fragment payload length of 8 octets, EF=8. In step 504, the APL 106 may receive a packet. In step 506, the processor 152 may determine a length for the packet, PL. In step 508, the processor 152 may determine a number of full length fragment payloads, FFP, which may be generated as a result of segmentation of the received packet. The value for FFP may be computed as shown in the following equation:

$$FFP = \mathrm{floor}\left(\frac{PL}{FF}\right) \quad [1]$$

where floor(x) is a function, which returns the integer portion of x. Following the computation shown in equation [1], a remaining portion of the packet may be determined as shown in the following equation:

$$\mathrm{remainder}_{FF} = PL - FFP \cdot FF \quad [2]$$

In step 510, the processor 152 may determine a number of half length fragment payloads, HFP, which may be generated in addition to the number of full length fragment payloads, FFP, as a result of segmentation of the remainder$_{FF}$. The value for HPF may be computed as shown in the following equation:

$$HFP = \mathrm{floor}\left(\frac{PL - FFP \cdot FF}{HF}\right) \quad [3]$$

Following the computation shown in equation [3], a remaining portion of the packet may be determined as shown in the following equation:

$$\mathrm{remainder}_{HF} = PL - HFP \cdot HF - FFP \cdot FF \quad [4]$$

In step 512, the processor 152 may determine a number of quarter length fragment payloads, QFP, which may be generated as a result of segmentation of the remainder$_{HF}$. The value for QPF may be computed as shown in the following equation:

$$QFP = \mathrm{floor}\left(\frac{PL - HFP \cdot HF - FFP \cdot FF}{QF}\right) \quad [5]$$

Following the computation shown in equation [5], a remaining portion of the packet may be determined as shown in the following equation:

$$\mathrm{remainder}_{QF} = PL - QFP \cdot QF - HFP \cdot HF - FFP \cdot FF \quad [6]$$

In step 514, the processor 152 may determine a number of eighth length fragment payloads, EFP, which may be generated as a result of segmentation of the remainder$_{QF}$. The value for EPF may be computed as shown in the following equation:

$$EFP = \mathrm{floor}\left(\frac{PL - QFP \cdot QF - HFP \cdot HF - FFP \cdot FF}{EF}\right) \quad [7]$$

Following the computation shown in equation [7], a remaining portion of the packet may be determined as shown in the following equation:

$$\mathrm{remainder}_{EF} = PL - EFP \cdot EF - QFP \cdot QF - HFP \cdot HF - FFP \cdot FF \quad [8]$$

In step 516, the processor 152 may determine whether an additional eighth length fragment payload may be generated based on the remaining portion of the packet remainder$_{EF}$. If remainder$_{EF}$>0, in step 528, the value EFP may be incremented. In step 518, the processor 152 may determine whether an additional quarter length fragment payload may be generated based on the remaining portion of the packet remainder$_{EF}$. If remainder$_{EF}$>EF, in step 530, the value QFP may be incremented, while the value EFP may be set to 0. In step 520, the processor 152 may determine whether an additional half length fragment payload may be generated based on the remaining portion of the packet remainder$_{EF}$. If remainder$_{EF}$>QF, in step 532, the value HFP may be incremented, while the value QFP may be set to 0. In step 522, the processor 152 may determine whether an additional full length fragment payload may be generated based on the remaining portion of the packet remainder$_{EF}$. If remainder$_{EF}$>HF, in step 534, the value FFP may be incremented, while the value HFP may be set to 0. In step 524, the APL 106 may generate fragments. The APL 106 may generate a plurality of FFP fragments comprising full length fragment payloads, HFP fragments comprising half length fragment payloads, QFP fragments comprising quarter length fragment payloads, and EFP fragments comprising eighth length fragment payloads. In step 526, the APL 106 may distribute the fragments among the PCS instances 108a, 108b, . . . , and 108c, which may cause the plurality of fragments to be transmitted via a plurality of physical links 142a, 144a, . . . , and 146a, which may be associated with a logical link 140. Step 504 may follow step 526.

An efficiency measure may be computed based on the fragmentation procedure. The total number of octets generated by the APL 106 may be computed as shown in the following equation:

$$\text{frag\_octets}_{total} = \quad [9]$$
$$FFP \cdot (hdr_{len} + CRC_{len} + FF) + HFP \cdot (hdr_{len} + CRC_{len} + HF) +$$
$$QFP \cdot (hdr_{len} + CRC_{len} + QF) + EFP \cdot (hdr_{len} + CRC_{len} + EF)$$

where $hdr_{len}$ may represent a length for the fragment header field, and $CRC_{len}$ may represent a length for the CRC field. In an exemplary embodiment of the invention, the length for the fragment header field may be 2 octets and the length for the CRC field may be 1 octet.

Based on the computation shown in equation [9] an efficiency measure may be computed as shown in the following equation:

$$\text{efficiency} = \frac{PL}{\text{frag\_octets}_{total}} \quad [10]$$

Various embodiments of the invention may be limited to candidate fragment length types comprising full length, half lengths, quarter length and/or eighth length fragments. Furthermore, fragment lengths may not be limited to 64 octets, 32 octets, 16 octets and/or 8 octets. Various embodiments of the invention may also be practiced with other fragment length types, for example three quarter length fragments, and for other fragment lengths, for example wherein a full fragment length is 128 octets.

Aspects of a system for optimizing fragment size for aggregation at the physical layer may include one more switch ICs 156 and/or physical (PHY) layer ICs 158 that enable reception of data packets via a medium access control (MAC) layer protocol entity 104. Each received data packet may be fragmented into a plurality of fragment payloads, wherein a length of each of the plurality of fragment payloads is selected from a plurality of candidate lengths. Each of the plurality of fragment payloads may be sent via a PHY layer protocol entity instance selected from a plurality of PHY layer protocol entity instances. The plurality of candidate lengths may comprise a full fragment length, half fragment length, quarter fragment length, and eighth fragment length.

The switch IC 156 and/or PHY layer IC 158 may enable generation of a number of fragment payloads having a length equal to the full fragment length when a length of the received packet is greater than the full fragment length. The switch IC 156 and/or PHY layer IC 158 may enable determination of a first remainder portion of the received packet subsequent to generating the full length fragment payloads.

The switch IC 156 and/or PHY layer IC 158 may enable generation of a number of fragment payloads having a length equal to the half fragment length when a length of the first remainder portion is greater than the half fragment length. The switch IC 156 and/or PHY layer IC 158 may enable determination of a second remainder portion of the received packet subsequent to generating the half length fragment payloads.

The switch IC 156 and/or PHY layer IC 158 may enable generation of a number of fragment payloads having a length equal to the quarter fragment length when a length of the second remainder portion is greater than the quarter fragment length. The switch IC 156 and/or PHY layer IC 158 may enable determination of a third remainder portion of the received packet subsequent to generating the quarter length fragment payloads.

The switch IC 156 and/or PHY layer IC 158 may enable generation of a number of fragment payloads having a length equal to the eighth fragment length when a length of the third remainder portion is greater than the eighth fragment length. The switch IC 156 and/or PHY layer IC 158 may enable determination of a fourth remainder portion of the received packet subsequent to generating the eighth length fragment payloads.

An additional eighth length fragment may be generated when a length of the fourth remainder portion is greater than 0 but less than or equal to the eighth fragment length. An additional quarter length fragment may be generated when a length of the fourth remainder portion is greater than the eighth fragment length but less than or equal to the quarter fragment length. An additional half length fragment may be generated when a length of the fourth remainder portion is greater than the quarter fragment length but less than or equal to the half fragment length. An additional full length fragment may be generated when a length of the fourth remainder portion is greater than the half fragment length but less than or equal to the full fragment length.

Various embodiments of the invention may not be limited to the embodiments shown herein but may comprise a plurality of wired and/or wireless communication systems in which a protocol data unit (PDU), such as a packet, may be segmented to generate a plurality of fragments. Various embodiments of the invention may comprise a method and/or system that enables a size for each of the generated fragments to be determined based on one or more criteria. An exemplary criterion may be based on a computed efficiency measure.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
receiving data packets via a medium access control (MAC) layer protocol entity;
fragmenting each of said received data packets into a plurality of fragment payloads, wherein said plurality of fragment payloads comprise a plurality of distinct fragment lengths selected from a plurality of candidate lengths, and wherein said plurality of candidate lengths comprises a full fragment length, half fragment length, quarter fragment length, and eighth fragment length;
sending said each of said plurality of fragment payloads via a physical layer protocol entity instance selected from a plurality of physical layer protocol entity instances; and
generating a number of fragment payloads having a length equal to said full fragment length when a length of said each of said received data packets is greater than said full fragment length.

2. The method according to claim 1, comprising determining a first remainder portion of said each of said received data packets subsequent to said generating said number of fragment payloads having said length equal to said full fragment length.

3. The method according to claim 2, comprising generating a number of fragment payloads having a length equal to said half fragment length when a length of said first remainder portion is greater than or equal to said half fragment length.

4. The method according to claim 3, comprising determining a second remainder portion of said each of said received packets subsequent to said generating said number of fragment payloads having said length equal to said half fragment length.

5. The method according to claim 4, comprising generating a number of fragment payloads having a length equal to said quarter fragment length when a length of said second remainder portion is greater than or equal to said quarter fragment length.

6. The method according to claim 5, comprising determining a third remainder portion of said each of said received packets subsequent to said generating said number of fragment payloads having said length equal to said quarter fragment length.

7. The method according to claim 6, comprising generating a number of fragment payloads having a length equal to said eighth fragment length when a length of said third remainder portion is greater than or equal to said eighth fragment length.

8. The method according to claim 7, comprising determining a fourth remainder portion of said each of said received packets subsequent to said generating said number of fragment payloads having said length equal to said eighth fragment length.

9. The method according to claim 8, comprising generating a fragment payload having a length equal to said eighth fragment length when a length of said fourth remainder portion is greater than 0 but less than or equal to said eighth fragment length.

10. The method according to claim 8, comprising generating a fragment payload having a length equal to said quarter fragment length when a length of said fourth remainder portion is greater than said eighth fragment length but less than or equal to said quarter fragment length.

11. The method according to claim 8, comprising generating a fragment payload having a length equal to said half fragment length when a length of said fourth remainder portion is greater than said quarter fragment length but less than or equal to said half fragment length.

12. The method according to claim 8, comprising generating a fragment payload having a length equal to said full fragment length when a length of said fourth remainder portion is greater than said half fragment length but less than or equal to said full fragment length.

13. A system comprising:
one or more circuits that enable reception of data packets via a medium access control (MAC) layer protocol entity;
said one or more circuits enable fragmentation of each of said received data packets into a plurality of fragment payloads, wherein said plurality of fragment payloads comprise a plurality of distinct fragment lengths selected from a plurality of candidate lengths, and wherein said plurality of candidate lengths comprises a full fragment length, half fragment length, quarter fragment length, and eighth fragment length; and
said one or more circuits enable sending of said each of said plurality of fragment payloads via a physical layer protocol entity instance selected from a plurality of physical layer protocol entity instances
wherein said one or more circuits enable generation of a number of fragment payloads having a length equal to said full fragment length when a length of said each of said received packets is greater than said full fragment length.

14. The system according to claim 13, wherein said one or more circuits enable determination of a first remainder portion of said each of said received packets subsequent to said generating said number of fragment payloads having said length equal to said full fragment length.

15. The system according to claim 14, wherein said one or more circuits enable generation of a number of fragment payloads having a length equal to said half fragment length when a length of said first remainder portion is greater than or equal to said half fragment length.

16. The system according to claim 15, wherein said one or more circuits enable determination of a second remainder portion of said each of said received packets subsequent to said generating said number of fragment payloads having said length equal to said half fragment length.

17. The system according to claim 16, wherein said one or more circuits enable generation of a number of fragment payloads having a length equal to said quarter fragment length when a length of said second remainder portion is greater than or equal to said quarter fragment length.

18. The system according to claim 17, wherein said one or more circuits enable determination of a third remainder portion of said each of said received packets subsequent to said generating said number of fragment payloads having said length equal to said quarter fragment length.

19. The system according to claim 18, wherein said one or more circuits enable generation of a number of fragment payloads having a length equal to said eighth fragment length when a length of said third remainder portion is greater than or equal to said eighth fragment length.

20. The system according to claim 19, wherein said one or more circuits enable determination of a fourth remainder portion of said each of said received packets subsequent to said generating said number of fragment payloads having said length equal to said eighth fragment length.

21. The system according to claim 20, wherein said one or more circuits enable generation of a fragment payload having a length equal to said eighth fragment length when a length of said fourth remainder portion is greater than 0 but less than or equal to said eighth fragment length.

22. The system according to claim 20, wherein said one or more circuits enable generation of a fragment payload having a length equal to said quarter fragment length when a length of said fourth remainder portion is greater than said eighth fragment length but less than or equal to said quarter fragment length.

23. The system according to claim 20, wherein said one or more circuits enable generation of a fragment payload having a length equal to said half fragment length when a length of said fourth remainder portion is greater than said quarter fragment length but less than or equal to said half fragment length.

24. The system according to claim 20, wherein said one or more circuits enable generation of a fragment payload having a length equal to said full fragment length when a length of said fourth remainder portion is greater than said half fragment length but less than or equal to said full fragment length.

\* \* \* \* \*